United States Patent [19]

Pachomoff et al.

[11] Patent Number: 4,742,975
[45] Date of Patent: May 10, 1988

[54] MOUNTING STRUCTURE FOR A TURBOJET ENGINE

[75] Inventors: Guy R. Pachomoff, Corbeil Essonnes; Raymond M. L. Rolinat, Avon, both of France

[73] Assignee: Societe Nationale d'Etude et de Construction de Moteurs d'Aviation (SNECMA), Paris, France

[21] Appl. No.: 60,026

[22] Filed: Jun. 9, 1987

[30] Foreign Application Priority Data

Jun. 10, 1986 [FR] France .............................. 86 08336

[51] Int. Cl.$^4$ .............................................. B64D 27/12
[52] U.S. Cl. ........................................ 244/54; 248/554
[58] Field of Search .......................... 244/53 R, 54, 55; 248/554, 555, 556, 557; 60/39.31

[56] References Cited

U.S. PATENT DOCUMENTS 3,907,220  9/1975  Amelio .............................. 248/557
4,065,077  12/1977  Brooks .
4,439,106  3/1984  Ferris et al. .

FOREIGN PATENT DOCUMENTS

1108012  1/1956  France .
2264241  3/1975  France .
1236917  6/1971  United Kingdom .
2045357  3/1979  United Kingdom .

Primary Examiner—Galen Barefoot
Assistant Examiner—Rodney Corl
Attorney, Agent, or Firm—Bacon & Thomas

[57] ABSTRACT

An engine mounting structure for a turbojet engine is disclosed which incorporates a safety rod in addition to the normal support rods used to attach a turbojet engine to a mounting structure. Under normal conditions, the safety rod is unstressed and supports none of the engine's weight. Upon rupture of one of the support rods, a tensile or compressive force exerted on the safety rod will move it into an active position so as to assume support of the engine's weight. A locking structure is also disclosed which will securely lock the rod in its active position such that it assumes the portion of the engine weight normally undertaken by the ruptured support rod.

16 Claims, 5 Drawing Sheets

MOUNTING STRUCTURE FOR A TURBOJET ENGINE

BACKGROUND OF THE INVENTION

Turbojet engines mounted beneath aircraft wings are typically suspended from a strut by a suspension means adjacent the front and rear of the engine. The suspension means comprises members to support the weight of the engine and to resist the rotational torque generated by the engine. Such suspension means typically comprise support bars or rods having one end fixed to the suspension means and the other to the engine. The rear suspension of the turbojet engine typically comprises three such bars or rods attached by hinge means to an engine casing ring and to three points on a rear strut of the aircraft suspension pylon.

In the event that one of the three suspension rods breaks, the two remaining rods must withstand the entire load which was previously spread over the three rods. This presents the danger of consecutive breaking of the two remaining rods thereby causing the total failure of the engine support system. Even in the event that the two remaining rods fail to break, the rotational torque generated by the engine and applied to the anti-torque bars may become excessive, thereby causing damage to the engine.

In order to prevent such a catastrophic failure of the engine support system, safety systems have been proposed. One such solution consists in doubling the rear suspension rods in the three axes. However, this solution to the problem has generated suspension systems with excess weight and complexity due to the necessity of forming the spare support elements of sufficient size and strength so as to enable it to withstand the maximum forces generated upon failure of the primary suspension system.

British Pat. No. 1,236,917 describes a turbojet engine suspension system in which an additional safety rod is incorporated into the normal three rod suspension system. However, no means are described for changing the position of the safety rod fro a normal, non-supporting position, to one in which it serves to support at least a partial engine load.

Other engine suspension systems are known in which an additional, safety rod normally performs no suspension function, however, should one of the normal support rods fracture, the safety rod then absorbs at least a part of the engine weight. However, these systems typically involve fixed clearances in the rod mounting such that these clearances are maintained during the normal suspension operation to prevent the rod from bearing any engine loads. Upon failure of one of the other suspension rods, the clearancese are taken up by engine movement such that the safety rod performs a support function.

SUMMARY OF THE INVENTION

The present invention relates to a suspension system for supporting a turbojet engine below an aircraft wing, more particularly to such a suspension system for the rear part of the engine.

The invention provides a safety support rod in addition to the plurality of support rods which normally serve to attach the engine to the aircraft support strut. The three conventional suspension rods, in normal operation, support all of the engine loads while the fourth, safety rod is non-existent in regards to the suspension forces. The safety rod becomes active only if one of the three rods of the normal suspension system should break.

Another object of the invention is to provide the suspension system with means for generating an alarm system to the aircraft pilot or to act directly as a control signal to regulate the engine to decrease its speed so as to reduce the stresses on the suspension system.

It is an object of the present invention to provide a safety suspension system which, in the event of a fracture of the normal suspension rod, is capable of withstanding the maximum stresses for which the normal suspension system is rated.

The invention also emcompasses means to move the safety from its passive position, wherein it is free from any loads generated by the engine, to an active position wherein it supports at least a portion of the engine loads. The drive means includes means for locking the safety rod in the active safety position once the safety rod has been moved to that position by failure of one of the normal suspension support rods.

The attaching means for attaching the safety rod to the support strut includes an intermediate position, in which the safety rod is not subjected to engine stress loads and two extreme positions in which the rod will support at least a portion of the engine loads. The extreme position to which the safety rod is moved is determined by whether the initial force on the safety rod is in tension or compression. This, of course, depends upon which of the normal support rods has ruptured.

The movable end of the safety rod is supported on a shaft rotatably mounted on an eccentric cam which, in turn, is attached to a shaft rotatably mounted on the support strut. When the safety rod is in the intermediate position, the central axis of the eccentric cam, which is laterally displaced from the rotational axis of the shaft, is disposed such that the axis of symmetry of the safety rod passes through the central axis of the eccentric cam, but does not intersect the rotational axis of the shaft. When the safety rod is moved to its active position, the eccentric cam and shaft rotate such that the axis of symmentry intersects or passes near the rotational axis of the shaft.

DETAILED DESCRIPTION OF THE PREFERRED EMBODIMENT

Figure 1:
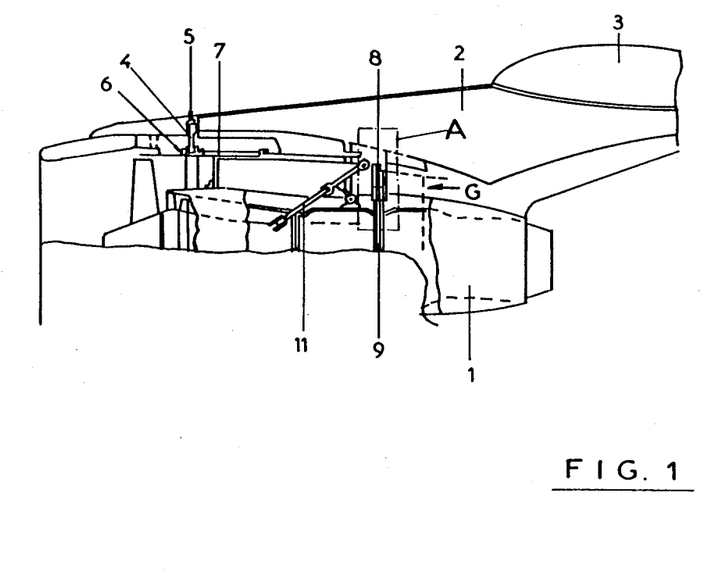
FIG. 1 is a partial, cut away view of a turbojet engine suspended from a support strut of an aircraft illustrating the suspension system according to the invention.

FIG. 1 shows a turbojet engine 1 suspended from a pylon 2 attached to the wing 3 of an aircraft. The engine 1 is suspended by front suspension rods 4 attached to the front part 5 of the pylon 2 and connected to a front attaching ring 6 on the fan stator casing 7. A rear support strut 8 is attached to the pylon 2 and is connected to a rear suspension flange 9 of the engine by three support rods 10. Thrust absorbing bars 11 connect the rear strut to the engine case and are symmetrically arranged on either side of a vertical diametrical plane of the engine.

Figures 2, 2A, 2B:
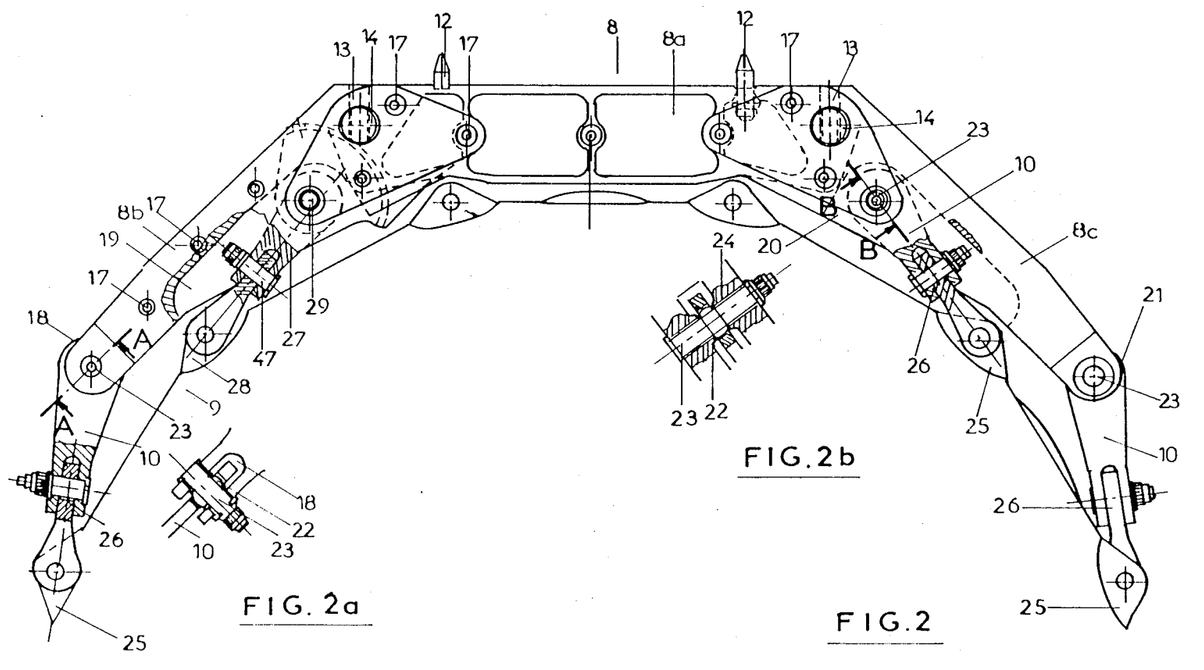
FIG. 2 is a partial view taken in a direction of arrow G in FIG. 1 showing the rear suspension strut incorporating the safety rod of the invention.
FIG. 2a is a partial, sectional view taken along line A—A in FIG. 2.
FIG. 2b is a partial, sectional view taken along line B—B in FIG. 2.

FIG. 2 shows a view of the rear support strut 8 viewed in the direction of arrow G in FIG. 1. The strut 8 is located on pylon 2 by studs 12 and is fixed to the pylon by bolts passing through vertical bores 13 which cooperate with holding shafts 14. The strut 8 comprises a generally horizontal portion 8a and two angularly inclined portions on either side 8b and 8c so as to encircle an upper portion of the engine. The strut 8 comprises symmetrical forged elements 15 and 16 (see FIG. 4) which makes up the portion 8a, 8b and 8c. The elements 15 and 16 define clearances 18, 19, 20 and 21. Clearances 18, 20 and 21 define a clevice-type joint for the attachment of rods 10 by hinge menas 22 and shafts 23 provided with shoulder bearings 24. The joints for attaching the rods 10 to the strut 8 are shown in detail in FIGS. 2a and 2b. Support rods 10, which are normally three in number are attached to elements 25 formed on suspension flange 9 of the engine casing by known means.

As shown in FIG. 2, each of the support rods 10 may be formed in two portions joined together by a universal type joint 26. The universal joint 26 will allow the support rods 10 to accommodate axial expansion and contraction of the engine due to the changes in engine temperature during its operation.

Figure 4:
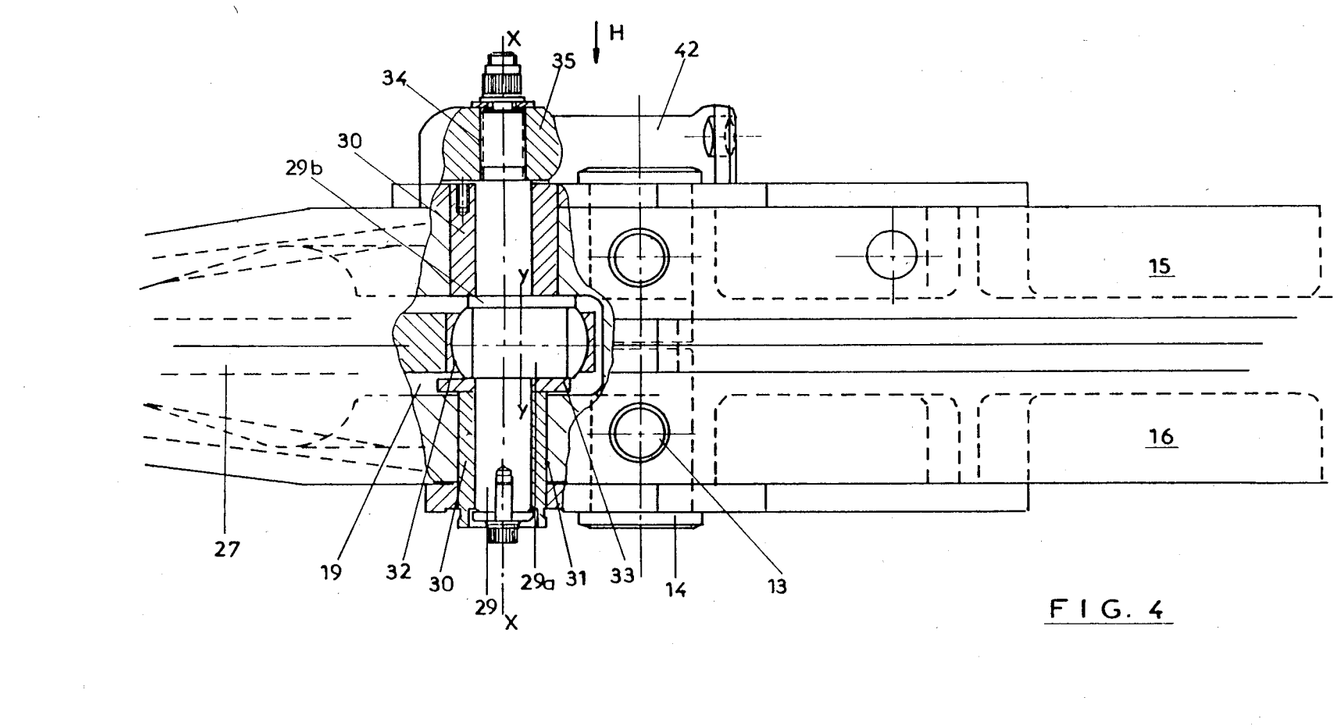
FIG. 4 is a partial, top view of the suspension strut and safety rod, partially cut away, taken in the direction of F in FIG. 3.

A safety rod 27 is also attached between the support strut 8 and the flange 9. A fourth hinge connection 28 serves to attach one end of the safety rod 27 to the flange 9 such that it may pivot about a Z—Z axis. The other end of the safety rod 27 is attached to the support strut 8 by shaft 29 which is rotatably mounted in bore 31 (defined by strut 8) by bearings 30, as illustrated in FIG. 4. Eccentric cam 29a is mounted on shaft 29 such that its central axis Y—Y is laterally displaced from the axis of rotation X—X of shaft 29. The end of safety rod 27 is attached to the eccentric cam 29a by universal socket joint 32 between a shoulder 29a of the cam and a washer 33.

Figure 3:
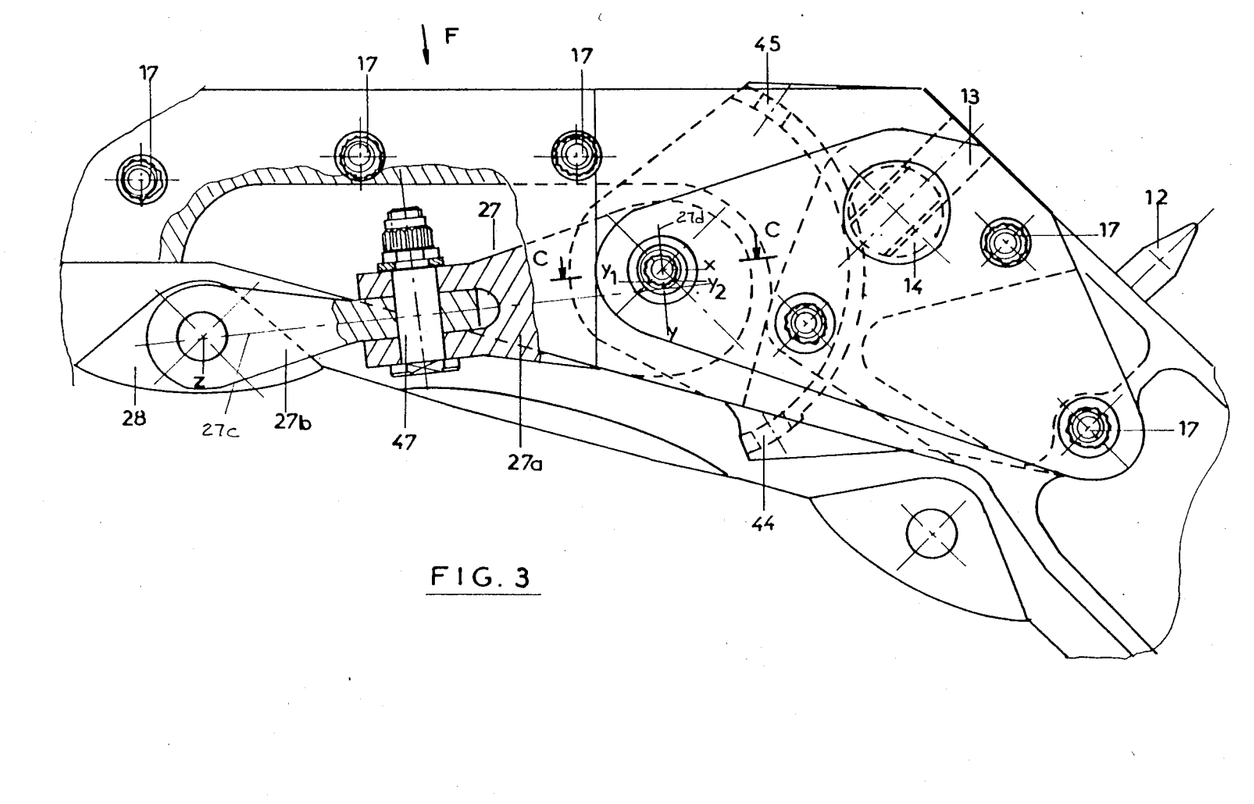
FIG. 3 is a partial, enlarged rear view of the safety rod according to the invention.

When the safety rod 27 is in its intermediate, inactive position (the position in which it assumes no load from the engine) the longitudinal axis of symmetry of the safety rod 27, indicated at 27c in FIG. 3, passes through the central axis Y—Y of eccentric cam 29a. In the intermediate position, the axis of symmetry 27c is displaced from the axis of rotation X—X of shaft 27 such that a line 27d passing through both the axis of rotation X—X of shaft 27 and the central axis Y—Y of the eccentric cam 29 will be substantially orthoganal to the axis of symmetry 27c. Thus, the safety rod 27 does not take any of the stresses caused by the suspension of the engine which is totally affected by the support rods 10.

Locking arm 35 is fixedly attached to end 34 of shaft 29 by a splined or fluted connection such that arm 35 rotates with shaft 29. Locking arm 35 extends generally perpendicular to the shaft 29 and lies adjacent to an outer surface of support strut 8. The distal end portion of arm 35 defines a longitudinally extending bore 36 in which a generally cylindrical stud 37 is slidably retained. Spring 38 is interposed between the innermost portion of stud 37 and the bottom of bore 36 so as to exert a biasing force on the stud 37 tending to move it outwardly from the bore 36. Screw 40 is inserted through the wall of shaft 35 such that its innermost portion engages a longitudinal groove 39 formed in stud 37. This serves to guide the motion of the stud 37 with respect to the arm 35 and to limit its inward and outward movement.

An arcuate flange 42 whose center of curvature coincides with the X—X axis of shaft 29 is mounted adjacent the distal end of the locking arm 35 on support strut 8. A wheel 41 is rotatably mounted on the exposed end fo stud 37 such that it bears against the inner arcuate surface of flange 42 and is biased against this surface by spring 38. The arcuate flange 42 defines openings 44 and 45 adjacent either of its ends, the openings being sized so as to accommodate the end of stud 37. Microswitches 46 are mounted on plate 43 attached to support strut 8 such that their actuating levers 47 are aligned with openings 44 and 45, respectively. Thus, when locking arm 35 is rotated with the shaft 29, stud 37 will enter either of the openings 44 or 45 when the arm approaches its extreme operating positions such that the end of stud 37 will pass through either one of the openings 44 or 45 and actuate the levers 47 of either one of the microswitches 46. The microswitches may operate an alarm signal in the aircraft cockpit to advise the pilot that the safety strut has been moved into an operative position, or the circuit may directly control the turbojet engine to reduce its output so as to prevent damage to the structure.

Figures 5, 5A:
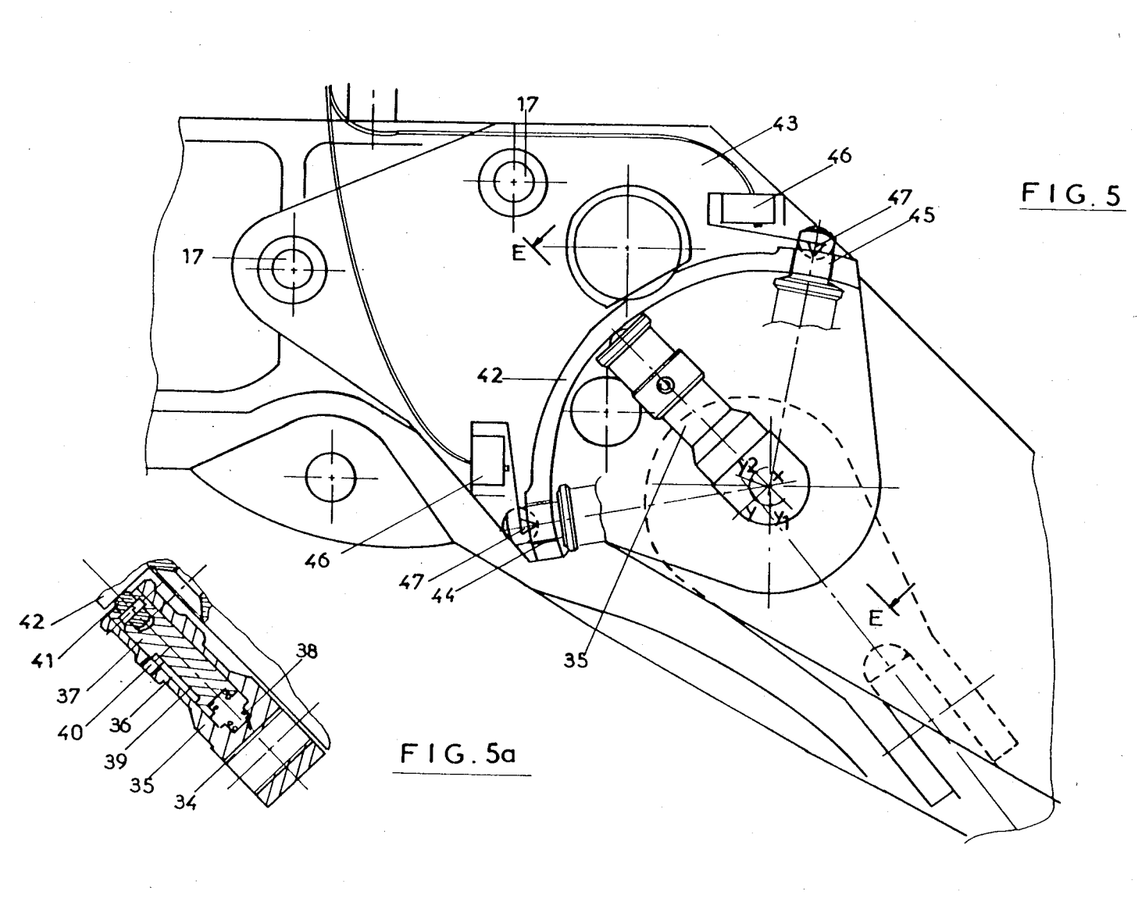
FIG. 5 is a partial, enlarged view of the suspension strut and the safety rod taken in the direction of arrow H in FIG. 4.
FIG. 5a is a partial, sectional view taken along line E—E in FIG. 5.

As best seen in FIGS. 3 and 5, when the safety rod 27 is in its intermediate position, the central axis of eccentric cam 29a is in the position y shown in these figures and the locking arm is in the position indicated by solid lines in FIG. 5. If one of the normal support rods 10 should rupture, a portion of the engine weight will then be supported by safety rod 27. This initial force, which may be tensile or compressive, depending on which of the normal support rods 10 has ruptured, applied to safety rod 27 causes the eccentric cam 29a to rotate in such a manner that its central axis Y—Y will pass sinto the y1 position, shown in FIGS. 3 and 5, if the initial force on the rod 27 is tensile, or into the y2 position if the initial force is compressive. Movement of eccentric cam 29a causes rotation of shaft 29 which, in turn, drives locking arm 35 until stud 37 comes into alignment with one of these openings, stud 37 is forced through the opening due to spring 38 so as to activate the microswitch 46. Engagement of the stud 37 in the opening 44 or 45 also serves to lock the arm 35 into its extreme position. It also serves to lock the shaft 29 in one of the two active extreme positions such that the rod 27 will then continue to function as a stressed engine support in the same manner as previously performed by the ruptured rod 10.

In order to allow for axial engine displacement, safety rod 27 may be formed by elements 27a and 27b interconnected by a universal type joint 47. As indicated in FIG. 3, element 27a is attached to support strut 8 via shaft 29, while second element 27b is attached to flange 9 via hinge 28.

The safety system according to the invention provides a turbojet engine mounting structure having the requisite safety characteristics, but also one having a low weight, relatively simple construction. The engine mounting structure also provides the advantage of having means to generate an alarm signal to alert the aircraft pilot or one to act directly on the engine to reduce it power output to prevent further damage.

The foregoing description is provided for illustrative purposes only and should not be construed as in any way limiting this invention, the scope of which is defined solely by the appended claims.

What is claimed is:

1. An engine mounting structure for attaching a turbojet engine to a support strut of an aircraft comprising:
   (a) a plurality of support rods attached to the support strut and the engine so as to normally support the engine;
   (b) a safety rod adapted to be interconnected between the support strut and the engine;
   (c) attaching means attaching the safety rod to the support strut and the engine such that an end of the support rod is movable between an intermediate position wherein the safety rod does not support any engine weight and extreme positions wherein it supports the at least a portion of the weight of the engine; and,
   (d) locking means to lock the end of the safety rod in one of its extreme position.

2. The engine mounting structure according to claim 1 wherein the support strut defines a bore and the attaching means comprises:
   (a) a shaft rotatably mounted in the bore, the shaft having an eccentric cam thereon, a central axis of the cam being laterally displaced from a longitudinal axis of the shaft; and,
   (b) means to attach a first end of the safety rod to the eccentric cam such that an axis of symmetry of the safety rod passes through the central axis of the eccentric cam.

3. The engine mounting structure according to claim 2 wherein the eccentric cam is oriented such that, when the safety rod is in its intermediate position, the axis of symmetry of the safety rod is displaced from the axis of rotation of the shaft.

4. The engine mounting structure according to claim 3 wherein a line passing through the axis of rotation of the shaft and the central axis of the eccentric cam is generally perpendicular to the axis of symmetry of the safety rod when the safety rod is in its intermediate position.

5. The engine mounting structure according to claim 2 wherein the locking means comprises:
   (a) a locking arm fixedly attached to the shaft and having a distal end;
   (b) arcuate flange means fixedly attached to the support strut adjacent the distal end of the locking arm;
   (c) latch means mounted on the locking arm; and,
   (d) means defined by the arcuate flange means to engage the latch means and lock the locking arm in positions corresponding to the extreme positions of the safety rod.

6. The engine mounting structure according to claim 5 wherein the latch means comprises:
   (a) a bore defined by the locking arm;
   (b) a latching stud slidably retained in the bore; and,
   (c) spring biasing means interposed between the locking arm and the latching stud so as to bias the latching stud toward the arcuate flange.

7. The engine mounting structure according to claim 6 wherein the arcuate flange means defines openings to engage the latching stud.

8. The engine mounting structure according to claim 7 further comprising:
   (a) limit switch means attached to the support strut and adapted to be actuated by contact with the latching stud extending through one of the openings defined by the arcuate flange means; and,
   (b) alarm means operatively connected to the limit switch means to provide an alarm when the limit switch means is actuated.

9. The engine mounting structure according to claim 1 wherein the safety rod comprises:
   (a) a first element having a first end attached to the support structure and a second end;
   (b) a second element having a first end attached to the engine and a second end; and,
   (c) universal joint means interconnecting the second ends of the first and second elements.

10. The engine mounting structure according to claim 9 wherein the support strut defines a bore and the attaching means comprises:
    (a) a shaft rotatably mounted in the bore, the shaft having an eccentric cam thereon, a central axis of the cam being laterally displaced from the longitudinal axis of the shaft; and,
    (b) means to attach the first end of the first element of the safety rod to the eccentric cam such that an axis of symmetry of the safety rod passes through the central axis of the eccentric cam.

11. The engine mounting structure according to claim 10 wherein the eccentric cam is oriented such that, when the safety rod is in its intermediate position, the axis of symmetry of the safety rod is displaced from the axis of rotation of the shaft.

12. The engine mounting structure according to claim 11 wherein a line passing through the axis of rotation of the shaft and the central axis of the eccentric cam is generally perpendicular to the axis of symmetry of the safety rod when the safety rod is in its intermediate position.

13. The engine mounting structure according to claim 12 wherein the locking means comprises:
    (a) a locking arm fixedly attached to the shaft and having a distal end;
    (b) arcuate flange means fixedly attached to the support strut adjacent the distal end of the locking arm;
    (c) latch means mounted on the locking arm; and
    (d) means defined by the arcuate flange means to engage the latch means and lock the locking arm in positions corresponding to the extreme positions of the safety rod.

14. The engine mounting structure according to claim 13 wherein the latch means comprises:
    (a) a bore defined by the locking arm;
    (b) a latching stud slidably retained in the bore; and,
    (c) spring biasing means interposed between the locking arm and the latching stud so as to bias the latching stud toward the arcuate flange.

15. The engine mounting structure according to claim 14 wherein the arcuate flange means defines openings to engage the latching stud.

16. The engine mounting structure according to claim 15 further comprising:

(a) limit switch means attached to the support strut and adapted to be actuated by contact with the latching stud extending through one of the openings defined by the arcuate flange means; and, (b) alarm means operatively connected to the limit switch means to provide an alarm when the limit switch means is actuated.

* * * * *

UNITED STATES PATENT AND TRADEMARK OFFICE
CERTIFICATE OF CORRECTION

PATENT NO. : 4,742,975

DATED : May 10, 1988

INVENTOR(S) : PACHOMOFF ET AL

It is certified that error appears in the above—identified patent and that said Letters Patent is hereby corrected as shown below:

Column 1, line 42, "fro" should be --from--.

Column 1, line 54, "clearancese" should be --clearances--.

Column 2, line 16, after "safety" insert --rod--.

Column 2, line 44, "symmentry" should be --symmetry--.

Column 3, line 24, after "8c.", insert the sentence, --The elements 15 and 16 are joined by bolts 17 as shown in Figs. 2 and 3.--

Column 3, line 51, "29a" should be --29b--.

Column 5, line 8, "it" should be --its--.

Signed and Sealed this

Eighteenth Day of October, 1988

Attest:

DONALD J. QUIGG

Attesting Officer

Commissioner of Patents and Trademarks